United States Patent [19]
Regal

[11] Patent Number: 5,828,853
[45] Date of Patent: Oct. 27, 1998

[54] METHOD AND APPARATUS FOR INTERFACING TWO SYSTEMS OPERATING IN POTENTIALLY DIFFERING ENDIAN MODES

[75] Inventor: Michael L. Regal, Campbell, Calif.

[73] Assignee: Apple Computer, Inc., Cupertino, Calif.

[21] Appl. No.: 646,563

[22] Filed: May 8, 1996

Related U.S. Application Data

[63] Continuation-in-part of Ser. No. 436,989, May 8, 1995, abandoned.

[51] Int. Cl.⁶ .............................. G06F 12/10; G06F 13/00
[52] U.S. Cl. ...................... 395/308; 395/306; 395/309; 711/202
[58] Field of Search ....................... 395/308, 306, 395/200.14, 200.16, 200.18, 309, 200.67, 200.75, 200.76, 412, 419, 421.01, 421.02; 711/202, 209, 211, 212

[56] References Cited

U.S. PATENT DOCUMENTS

| | | | |
|---|---|---|---|
| 5,519,842 | 5/1996 | Atallah et al. | 711/202 |
| 5,524,256 | 6/1996 | Turkowski | 395/898 |
| 5,572,713 | 11/1996 | Weber et al. | 395/500 |
| 5,574,923 | 11/1996 | Heeb et al. | 395/800 |
| 5,634,013 | 5/1997 | Childers et al. | 395/280 |
| 5,640,545 | 6/1997 | Baden et al. | 395/161 |

*Primary Examiner*—Ayaz R. Sheikh
*Assistant Examiner*—Ario Etienne
*Attorney, Agent, or Firm*—Burns, Doane, Swecker & Mathis, L.L.P.

[57] ABSTRACT

A method of and apparatus for interfacing two systems which may not be operating in the same Endian mode. In one embodiment, the system generates both a transformed address information segment and an untransformed information segment and supplies one or the other to an address generator depending on whether Endian modes match.

13 Claims, 4 Drawing Sheets

METHOD AND APPARATUS FOR INTERFACING TWO SYSTEMS OPERATING IN POTENTIALLY DIFFERING ENDIAN MODES

This application is a Continuation-In-Part of parent application 08/436,989, filed May 8, 1995, now abandoned.

FIELD

The present invention relates to a method and apparatus for translating an address on a first bus in one Endian mode to an address on a second bus which may be running in another Endian mode.

BACKGROUND

Computer architecture typically use one of two types of ordering modes for transferring, processing, and storing data. They are the Big Endian mode and Little Endian mode. In a system having a Big Endian architecture such as the Apple PowerMac implementation of the PowerPC chip, the "big end" of a data field is stored first. Thus, 0×1234 would be stored as (0×12 0×34) in memory. On the other hand, in a system with a Little Endian architecture such as one based on an Intel x86 microprocessor, the "little end" of a data word is stored first. Thus, a hex word such as 0×1234 is stored in memory as (0×34 0×12). The same is true for a four-byte value; for example, 0×12345678 would be stored as (0×78 0×56 0×34 0×12).

In more detail, FIG 1(a) would be a descriptor based direct memory access (DBDMA) descriptor format for a sixteen byte value in a Big Endian system. The term descriptor refers to DMA command list elements which are often simply buffer descriptors. The term DMA indicates that data transfers are performed by a relatively simple state machine processing commands generated by a relatively sophisticated processor. Note that the descriptor format follows the convention that more significant bytes are to the left and less significant bytes are to the right. In the descriptor format, field C is a command byte, field F contains various flags, field L contains a length count, field A is an address, and field X is a data word. Each field of the descriptor has an offset as shown, i.e, the offset for field C is 0, for field F it is 1, and so on.

The primary difference between Big Endian and Little Endian has to do with what is considered the beginning of each field. As mentioned, in a Big Endian system, memory is organized with the address of each byte increasing from the most significant byte MSB to the least significant byte LSB. This means that the address of the MSB of the address field A is 4 while byte 7 corresponds to the LSB of the address field A. Generally, the bit numbering follows the byte numbering. Thus, the first bit designates the most significant bit and will have the lowest bit number.

On the other hand, FIG. 1(b) shows what would be a DBDMA descriptor format for a sixteen byte value in a Little Endian system. The descriptor format again follows the convention that more significant bytes are to the left and less significant bits are to the right. Since the order is reversed, the offsets refer to the least significant byte of each field. Hence, in this example, byte 4 refers to the least significant byte of the address field A while the byte 7 refers to the most significant byte of the address field A.

Bit numbering within a Little Endian architecture naturally follows that of the byte ordering. Thus, bit 0 represents the least significant bit of a field, and, in bit field designations, the first bit denoted will be the most significant and will have the highest bit number.

As mentioned, Intel x86 systems are Little Endian systems as are VAX systems. The Peripheral Component Interconnect (PCI) standard is also Little Endian. The RISC-based MIPS computers and the DEC Alpha computers are configurable for Big Endian or Little Endian. The PowerPC is more naturally a Big Endian system, although it is switchable between Big Endian and Little Endian modes, as is the Sparc chip. The Apple PowerMac implementation of the PowerPC chip can run in the Big Endian mode.

It may be desirable in some circumstances to interface a Little Endian system with a Big Endian system. For example, it may be desirable to interface a PCI bus with an ARBus using a bridge 50. This is shown in FIG. 2. When attempting this, due to the fundamental difference in ordering, the bridge 50 may have to rearrange data transferred between the Big Endian system and Little Endian system. For example, consider Little Endian data whose memory image is as shown in FIG. 3(a). If Big Endian byte lane numbers are placed on the diagram, then the data format of FIG. 3(b) is obtained. While the byte ordering for the data within the fields is correct, the addressing is wrong. For example, the address, which should be in byte lanes 4 through 7, is actually in byte lanes 0 through 3. The addresses of the fields have been "swizzled". It is necessary to unswizzle the addresses before the data can be used.

Also, the ARBus can actually be Bi-Endian in that it is capable of operating in a Little Endian as well as a Big Endian mode. Thus, the bridge 50 must be able to effect byte swapping and address swizzling conditionally depending on the current "Endianess"of the ARBus.

SUMMARY

It is an object of the present invention to overcome the problems cited above by providing a method and apparatus for interfacing two systems wherein one system is operating in a Little Endian mode and the other system may be operating in either a Big Endian or a Little Endian mode.

According to one embodiment of the present invention, a method for translating a Little Endian address is disclosed. First, a Little Endian information segment made up of a group of bytes is received. Then, if a destination system is operating in a Big Endian mode, a Big Endian address is generated based on the Little Endian information segment.

According to another embodiment of the present invention, an apparatus for translating an address on a first 32-bit data bus operating in a Little Endian mode to a an address on a second 64-bit data bus operating in a Big or Little Endian mode is disclosed. A combiner combines two 32-bit pieces of data information from the first bus to form a 64-bit data information segment. The order of the bits is reversed. Finally, the second bus address is generated based on the information from the resulting address information segment, reversed for a Little Endian second bus and not reveresed for a Big Endian second bus.

DETAILED DESCRIPTION

The present invention will be described with reference to interconnection of a PCI bus as a Little Endian bus and an Apple RISC bus (ARBus) as a Big Endian bus. However, it will be understood by one of ordinary skill in the art that the present invention applies to a variety of other architectures and is not limited to a structure which connects a PCI bus and an ARBus.

Generically, any device which connects two busses can be referred to as an "interface" or a "bridge." The terms will be used interchangeably herein. The functions described herein are carried out by the bridge as it translates the data and addresses which cross it from one bus domain to the other.

Figure 1A:
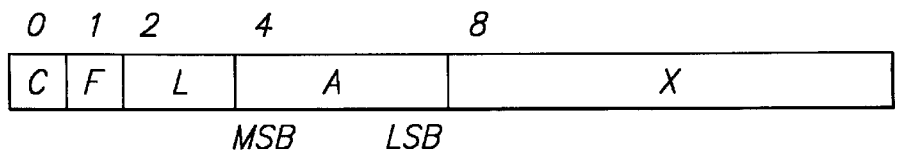
FIGS. 1(a) and 1(b) are diagrams of DBDMA descriptor formats for a Big Endian system and a Little Endian system, respectively.
Figure 1B:
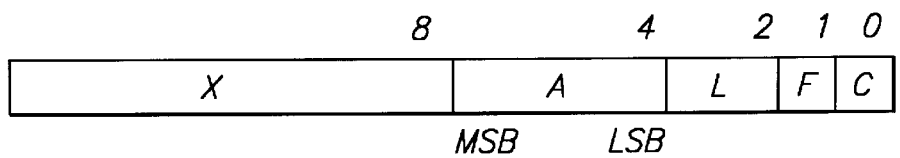
Figure 2:
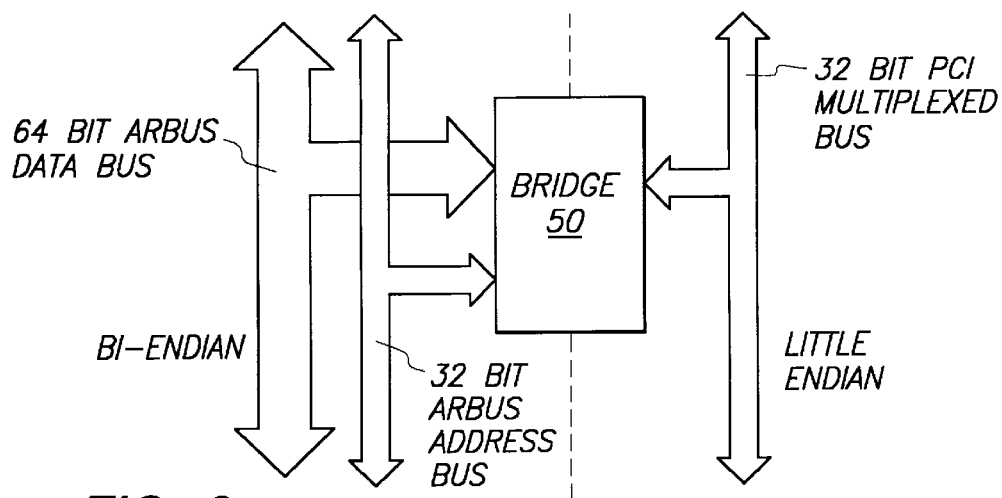
FIG. 2 is a functional block diagram of a system in which a bridge interfaces an ARBus and a PCI Bus.
Figure 3A:
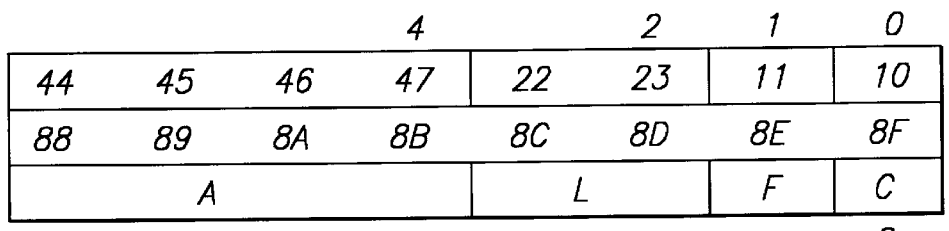
FIG. 3(a) is a Little Endian data segment.
Figure 3B:
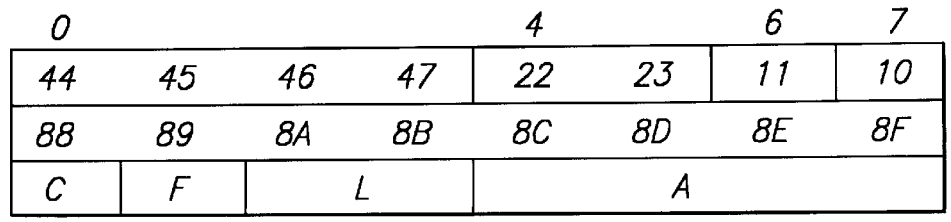
FIG. 3(b) is an illustration of transfer of the data segment directly into a Big Endian system with no provision for rearrangement.

The bridge in this example is a bridge 50 such as is shown in FIG. 2. The bridge 50 is the interface between the main system ARBus and the PCI. The bridge 50 provides a simple bridge function, buffering and translation transactions from one bus to the other.

The PCI and ARBus are operated asynchronously, PCI at 33 MHz and ARBus up to 50 MHz. It is preferable that the bridge 50 support the full PCI bandwidth and also supports burst transfers in both directions up to 32 bytes in length (cache block size).

As noted, the bridge 50 must perform appropriate byte swapping and address swizzling. Byte addressing is similarly numbered in conflicting order on either side of the bridge 50. It is also preferable that the bridge 50 support two modes of byte swapping, one for the case where the ARBus is operating in a Big Endian mode and another when the ARBus is operating in a Little Endian mode.

The ARBus includes a non-multiplexed 32-bit address bus, a 64-bit Big Endian data bus, and several control signals such as TSIZ, which is a two-bit control field on the ARBus. The ARBus supports two types of transactions. The first type of transaction supported by the ARBus is single beat transactions from 1 to 8 bytes where the data is contained within a single 64-bit data beat. This is encoded by specifying the starting address (the most significant byte of the transaction) as the address and its length by the TSIZ lines. These transactions are typically carried out when the memory area involved is marked as cache inhibited or write through.

The second type of data transaction supported by the ARBus is 32-bit cache sector bursts which are transferred in four 64 bit data beats. Burst reads start with the double word containing the "critical word" first for most PowerPC processors, with subsequent data wrapping around. Burst writes are always cache line aligned.

The PCI Bus has a multiplexed address/data (AD) bus. The basic PCI Bus incorporates a 32-bit wide path(AD [31:0]). Devices connected to the PCI Bus contain registers which are used to determine if the device is a target of a transaction. These registers are set up by the system during start-up. Three transaction types are provided in the standard PCI system: memory, I/O, and configuration. A memory transaction bus / address space supports a full 32-bit address bus, where a 30-bit address is transferred during the address phase. Four Byte-Enable lines (BE[3:0]) indicate which byte lanes contain valid data during data phases. The I/O transaction bus is limited to the first 64K of possible addresses. A 16-bit address is transferred during the address phase. The upper 16-bits of the address data bus are forced to 0's for the I/O cycle. The configuration space is designed to support system self-configuration. Each device must contain a 64 word "configuration register" set, the first 16 words of which have fixed functions. A "base address register" is included in this area, which designates addresses to which the device will respond during memory and/or I/O transactions. The configuration space accesses must generate a device specific select line to indicate which device is being accessed.

Figure 4:
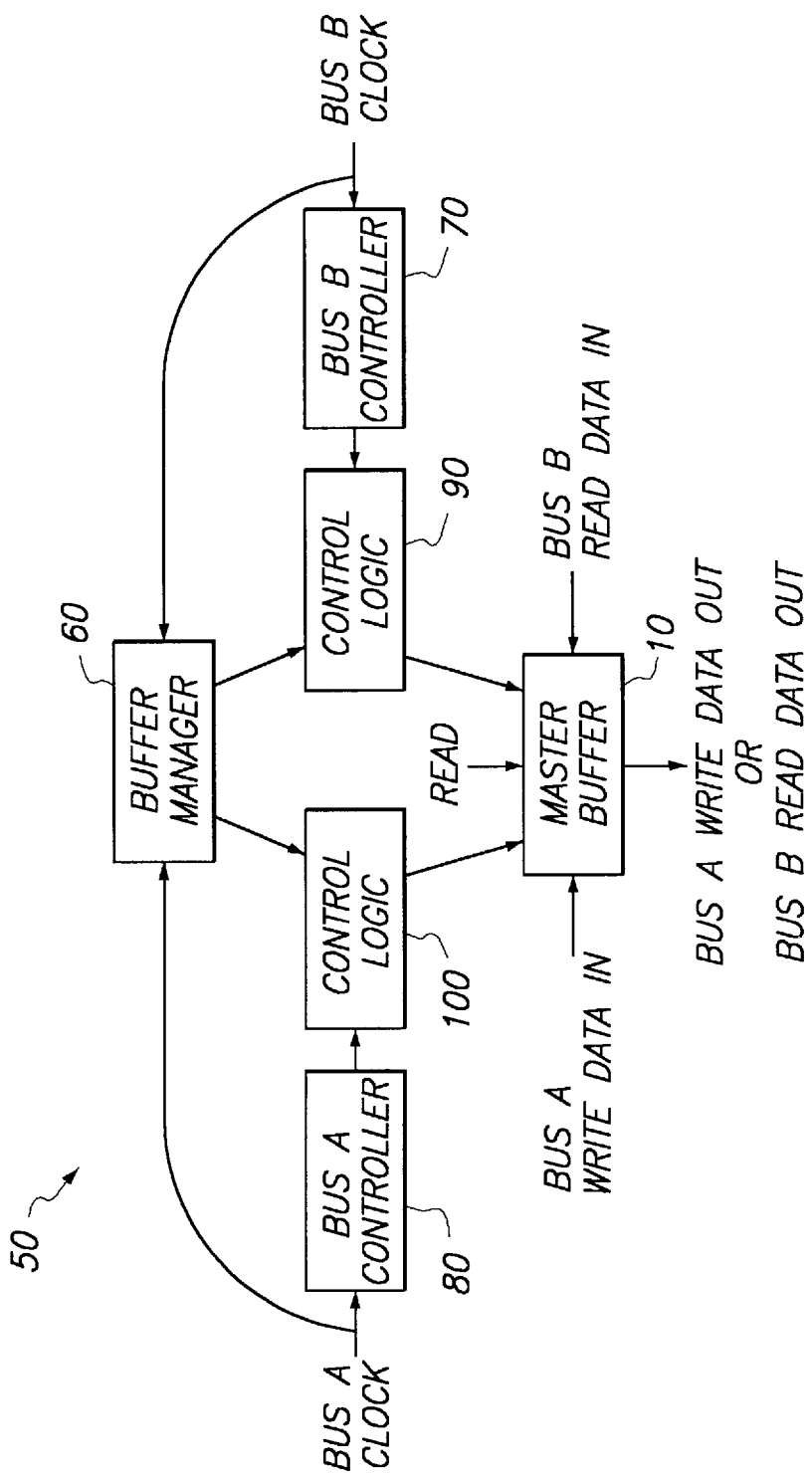
FIG. 4 is a block diagram of an interface system between two buses.

FIG. 4 shows an arrangement where two such buses are connected by a bridge or interface circuit 50. The ARBus is designated Bus A and the PCI Bus is designated Bus B.

The bridge circuit or interface 50 includes one main state machine per bus, a Bus A controller 80 and a Bus B controller 70. The Bus A controller 80 and the Bus B controller 70 operate in different clock domains and require that handshake signals be synchronized. A buffer manager 60 receives clock signals from both clock domains as well as two control logic units 90 and 100 which operate under the control of the buffer manager 60.

Figure 5:
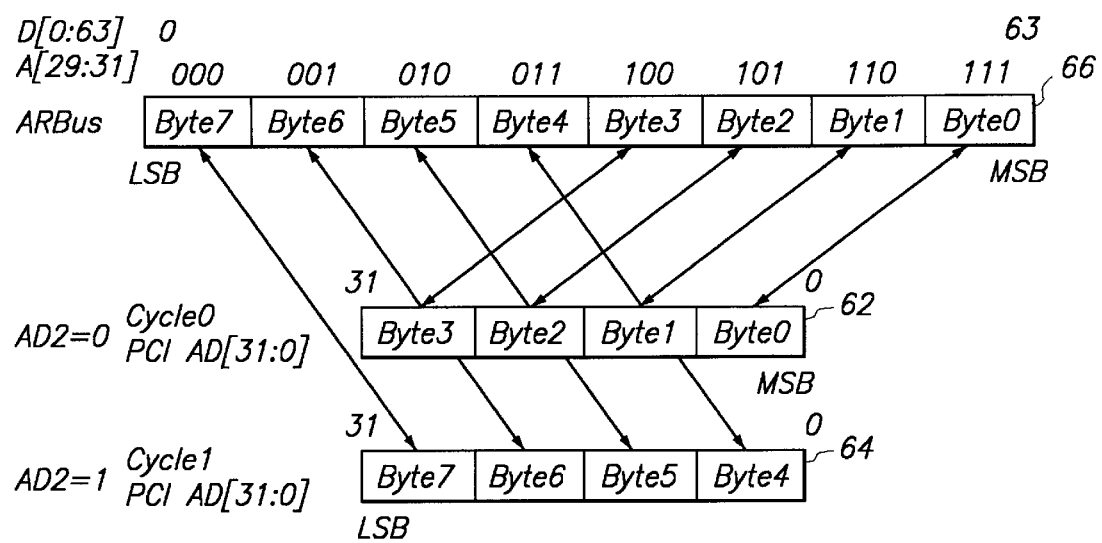
FIG. 5 illustrates an example of data byte swapping between buses in systems which are both in a Little Endian mode.
Figure 6:
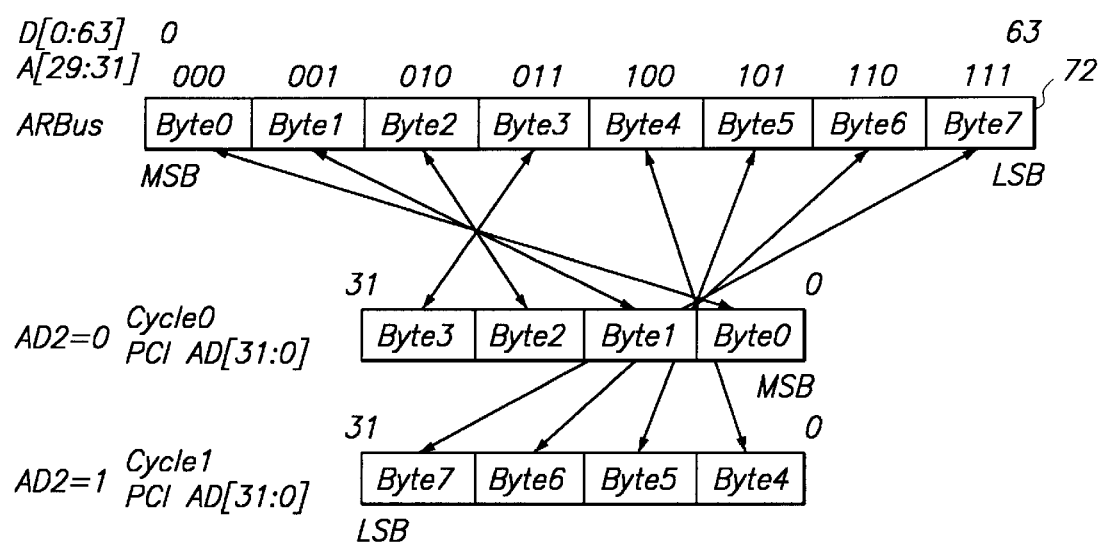
FIG. 6 illustrates an example of data byte swapping between one bus in a system operating in a Little Endian mode and a second bus in a system operating in a Big Endian mode.

The system including bus A, which is the ARBus in this example, is bi-Endian, that is, it may operate in either a Big Endian mode or a Little Endian mode. The B bus, which is a PCI Bus in this example, is defined to have Little Endian byte ordering. The bridge 50 accordingly needs to support two modes of byte swapping. The first byte swapping mode is a default Big Endian mode (used when the ARBus is in a Big Endian mode) that maps ARBus and PCI data bytes as shown in FIG. 5. The second byte swapping mode is a Little Endian mode (used when the ARBus is in a Little Endian mode and selected by setting a mode bit in a mode select register associated with the bridge 50) that maps ARBus to PCI data bytes as shown in FIG. 6. In FIG. 5 and FIG. 6, "MSB" and "LSB" are denoted with respect to how the data appears in the system processor's internal register, which is assumed to be in a Big Endian format.

With respect to FIG. 5, as noted above, the ARBus is 64-bits wide and the PCI Bus is 32-bits wide. As a result, an 8-byte data burst 66 on the ARBus is either formed from or divided into two 4-byte bursts 62 and 64 on the PCI Bus. Since both systems are in the Little Endian mode, the bytes in each burst on both buses are oriented in the same way from least significant bytes to most significant bytes. This means that no byte swapping is necessary. Thus, the 8-byte burst 66 can be divided into the two 4-byte bursts by transferring the four most significant bytes to the 4-byte burst 62 and the four least significant bytes to the 4-byte burst 64 without having to reorder the bytes.

Although no byte swapping is necessary, however, address swizzling must be performed by the interface to satisfy the address invariant requirements of the system. That is, the system requires that bytes get mapped across the bridge 50 according to their addresses (byte lane numbers). In other words, the address (lane number) of a byte must be the same on both sides of the bridge so that a byte in byte lane zero on one side of the bridge is in byte lane zero on the other side of the bridge.

Tables 1 and 2 illustrated below detail the mapping of ARBus to PCI Bus addresses in the Little Endian mode. In the tables, "Offset" refers to the start of an address, "Size"

is a three bit quantity defining how many bytes are valid, "BE" refers to Byte-Enables, and "BE's encoded" refers to the byte lanes that need to be enabled.

Table 1 is for ARBus to PCI address mapping in Little Endian mode for Memory Space. Table 2 is for ARBus to PCI Bus address mapping in Little Endian mode for I/O Space.

TABLE 1

| ARBus Address or Offset + Size | PCI Address | Comment |
|---|---|---|
| [0 . . . 28] | [31 . . . 3] | |
| Offset + Size = 1 | [2.0] = 3'b100, BEs encoded | Address Swizzle |
| Offset + Size = 2 | [2.0] = 3'b100, BEs encoded | Address Swizzle |
| Offset + Size = 3 | [2.0] = 3'b100, BEs encoded | Address Swizzle |
| Offset + Size = 4 | [2.0] = 3'b100, BEs encoded | Address Swizzle |
| Offset + Size = 5 | [2.0] = 3'b000, BEs encoded | Address Swizzle |
| Offset + Size = 6 | [2.0] = 3'b000, BEs encoded | Address Swizzle |
| Offset + Size = 7 | [2.0] = 3'b000, BEs encoded | Address Swizzle |
| Offset + Size > = 8 | [2.0] = 3'b000, BEs encoded | Address Swizzle |

TABLE 2

| ARBus Address or Offset + Size | PCI Address | Comment |
|---|---|---|
| [0 . . . 28] | [31 . . . 3] | |
| Offset + Size = 1 | [2.0] = 3'b111, BEs encoded | Address Swizzle |
| Offset + Size = 2 | [2.0] = 3'b110, BEs encoded | Address Swizzle |
| Offset + Size = 3 | [2.0] = 3'b101, BEs encoded | Address Swizzle |
| Offset + Size = 4 | [2.0] = 3'b100, BEs encoded | Address Swizzle |
| Offset + Size = 5 | [2.0] = 3'b011, BEs encoded | Address Swizzle |
| Offset + Size = 6 | [2.0] = 3'b010, BEs encoded | Address Swizzle |
| Offset + Size = 7 | [2.0] = 3'b001, BEs encoded | Address Swizzle |
| Offset + Size > = 8 | [2.0] = 3'b000, BEs encoded | Address Swizzle |

Note that the swizzling is performed by XORing the low order 3 bits of the address with a constant that depends on the data-size of the transaction. For example, for Memory Space, the binary constant is byte 100 (in binary) for transaction sizes of 4 or less, and byte 000 for transaction sizes greater than 4. The effective address itself is not modified, only its interpretation as used to access memory.

Thus, in Little Endian mode, the processor makes the memory "appear" to be organized in Little Endian order by "swizzling" the lower order address bits as accesses are made.

FIG. 6 illustrates data byte swapping when the ARBus is in the Big Endian mode and the PCI Bus is in the Little Endian mode. In this case, the byte order between the two buses is reversed. According to the present invention, this problem is overcome by transforming or byte swapping the byte order in the 8-byte burst 72 as is illustrated in FIG. 6. As a result of swapping, the MSB, Byte0, is first in the ARBus address, with subsequent bytes in the proper order and positions. Tables 3 and 4 below detail the mapping of ARBus to PCI Bus addresses in the Big Endian mode. Table 3 shows ARBus to PCI Bus mapping in Big Endian mode for Memory Space. Table 4 shows ARBus to PCI Bus mapping in Big Endian Mode for I/O space.

TABLE 3

| ARBus Address | PCI Address | Comment |
|---|---|---|
| [0] | [31] | |
| [1] | [30] | |

TABLE 3-continued

| ARBus Address | PCI Address | Comment |
|---|---|---|
| — | — | |
| [28] | [3] | |
| [29] | [2] | |
| [30] | [1] = 0, BEs encoded | Linear Incrementing Mode |
| [31] | [0] = 0, BEs encoded | Linear Incrementing Mode |

TABLE 4

| ARBus Address | PCI Address |
|---|---|
| [0] | [31] |
| [1] | [30] |
| — | — |
| [30] | [1], BEs encoded |
| [31] | [0], BEs encoded |

Note that the addresses need not be swizzled. All that is necessary is to note that the address used for the ARBus transaction is that of the Least-Significant byte lane being transferred (which becomes the most significant due to byte swapping).

In summary, when the bridge 50 is in Big Endian mode, it swaps data but leaves addresses unmodified. When in Little Endian mode, the bridge 50 performs no data swapping, but it swizzles addresses. The bridge 50 has a software-accessible mode bit which tells the bridge 50 in which mode to make accesses.

According to a presently preferred embodiment, the present invention, data Endian conversion is performed on the ARBus side of the bridge 50 with data being stored in a bridge buffer 10 in the PCI Bus Little Endian format. Address Endian swizzling is performed on the master side of the transaction. For a master cycle from the ARBus to the PCI Bus, the address swizzling occurs on the ARBus side, and for a master cycle from the PCI Bus to the ARBus, the address swizzling occurs on the PCI Bus side.

Figure 7:
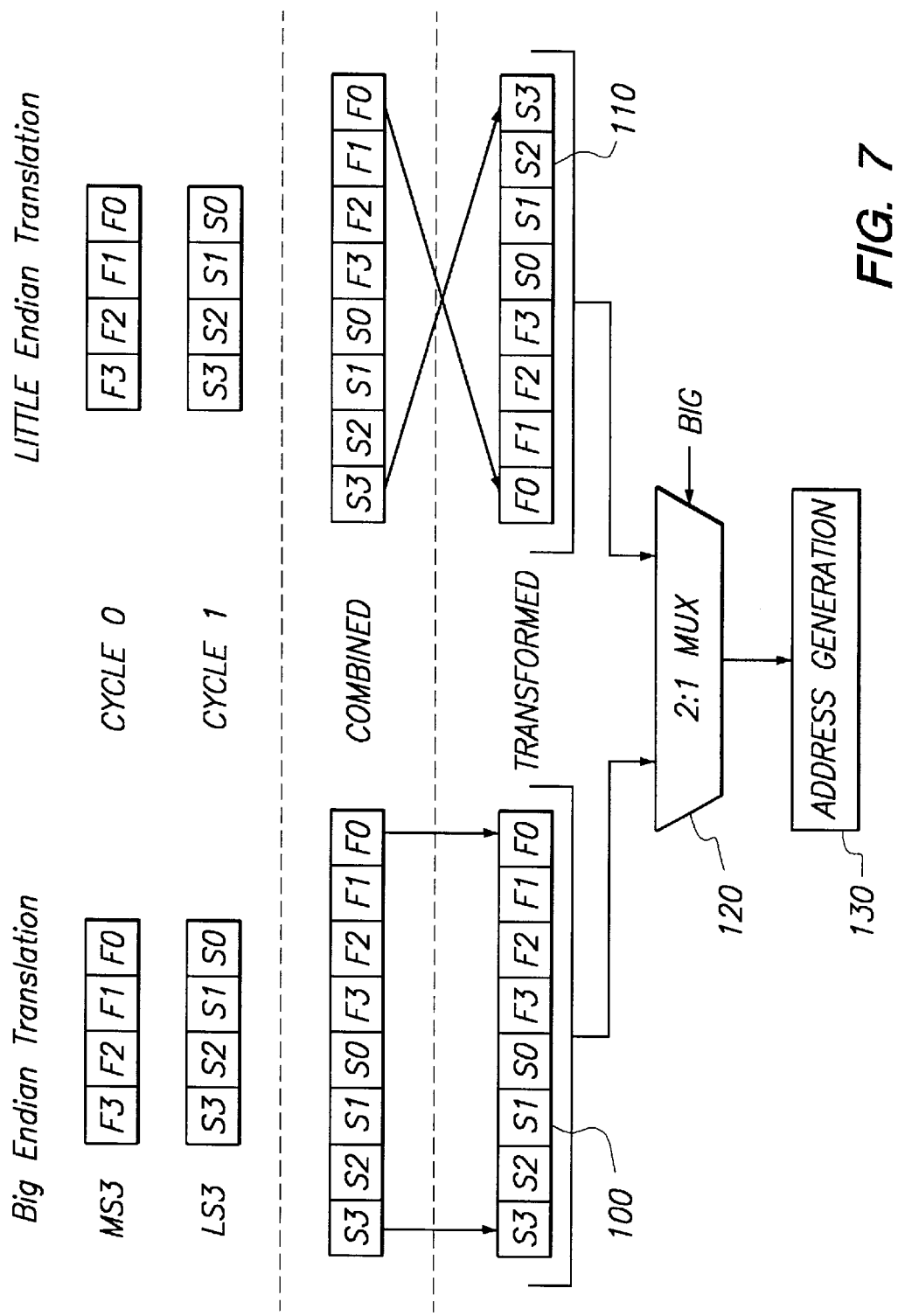
FIG. 7 is a diagram of an address decode scheme for generating addresses where the Endian operating modes of two systems may not match.

FIG. 7 shows the scheme implemented by the interface circuit 50 for byte swapping and address swizzling. The PCI address is made up of a first four bit address information set F3 through F0 in a cycle 0, with F3 through F0 representing the most significant four bytes of an eight byte quantity, and a second four byte address information field S3 through S0 in cycle 1, with S3 through S0 representing the least significant four bytes of an eight byte quantity. In this example, the address information set is the PCI Bus Byte-Enables (BE[3:0]) from which address swizzling information can be obtained. The two four bit address information sets are combined to form two distinct 8 bit information sets 100 and 110. In one of the eight bit information sets, set 110 representing the Little Endian translation as shown in FIG. 6, byte order is swapped, whereas in the other eight bit address information set, set 100 representing the Big Endian translation as shown in FIG. 6, byte order is maintained. The address information set 100 in the original order and the address information set 110 in the swapped order are supplied as inputs to a 2:1 multiplexer 120. The multiplexer 120 supplies as its output either the information set 110 (swapped order) if the control input BIG as dictated by the mode bit indicates that the ARBus is operating in the Little Endian mode so that Endian modes match or the information set 100 (swapped original order) if the control input BIG indicates that the ARBus is operating in the Big Endian mode so that Endian modes do not match. The output of the multiplexer 120 is supplied as an input to an address generator 130. The address generator 130 then determines the correct address using the method described above by determining which of the bytes is the first enabled byte and how many consecutive bytes after the first enabled byte are also enabled and then swizzling the address as appropriate depending on whether the bridge 50 is operating in the Little Endian or Big Endian mode.

The above system embodies one method of generating Little Endian addresses on the ARBus given the same PCI Bus enables. The method simplifies the overall address generation logic by permitting the use of only one major address generation block with inputs to the block (PCI Bus Byte Enables) being altered depending on whether the system including the ARBus is operating in the Big Endian mode or the Little Endian mode.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appending claims rather than the foregoing description, and all changes which come within the meaning and range of equivalents thereof are intended to be embraced therein.

What is claimed is:

1. A method of generating a translated address from first address from a first bus operating in a first Endian mode for use on a second bus operating in a second Endian mode, where said second Endian mode may be different from said first Endian mode, the method to being performed by a bridge across the first and second busses and comprising the steps of:

forming a first data segment comprising of a set of byte enable signals;

forming a swapped data segment comprising a rearrangement of said byte enable signals;

selecting one of said first data segment and said swapped data segment on the basis of an indication whether the first Endian mode is the same as said second Endian mode; and generating said translated address on the basis of the selected one of said first data segment and said swapped data segment;

wherein said second bus address is generated by detecting which byte is a first enabled byte and how many consecutive bytes after said first enabled byte are also enabled.

2. A method according to claim 1, wherein said first bus is a PCI Bus.

3. A method according to claim 1, wherein said second bus is an ARBus.

4. A method for translating a Little Endian address on a first bus to an address on a second bus, comprising the steps of:

receiving an address information segment consisting of a plurality of byte enable signals for said first bus;

determining whether said second bus is in a Little Endian or Big Endian mode;

generating an address for said second bus based on said address information segment when said second bus is in the Little Endian mode;

reversing the order of said bits in said address information segment when said second bus is in said Big Endian mode to form a reversed address information segment; and generating a second bus address from said reversed address information segment when said second bus is in said Big Endian mode;

wherein said second bus address is generated by detecting which byte is a first enabled byte and how many consecutive bytes after said first enabled byte are also enabled.

5. A method according to claim 4, wherein said first bus is a 32-bit bus and said second bus is a 64-bit bus.

6. A method according to claim 5, wherein said address information segment comprises two 4 bit segments.

7. A method according to claim 4, wherein said first bus is a PCI Bus.

8. A method according to claim 4, wherein said second bus is an ARBus.

9. An apparatus for translating an address on a first 32-bit bus operating in a Little Endian mode to an address on a second 64-bit bus operating in a Big Endian mode, comprising:

means for combining two 4 bit pieces of information comprising byte enable signals for said first bus to form an 8 bit information segment;

means for reversing the order of bits in said 8 bit information segment; and means for generating said second bus address from said reversed information segment;

wherein said second bus address is generated by detecting which byte is a first enabled byte and how many consecutive bytes after said first enabled byte are also enabled.

10. An apparatus according to claim 9, wherein said first bus is a PCI Bus.

11. An apparatus according to claim 9, wherein said second bus is an ARBus.

12. A method of interfacing a first 32-bit bus in a first system operating in a Little Endian mode and a second 64-bit bus in a second system operating in one of a Little Endian mode and a Big Endian mode, comprising the steps of:

combining a first address information segment F3 . . . F0 comprising byte enable signals with a second address information segment S3 . . . S0 comprising byte enable signals from said first bus to form a combined address information segment S3 . . . F0;

reversing the order of said combined address information segment to form a transformed bit address information segment; and supplying said combined address information segment to an address generator for said second system if said second system is operating in a Little Endian mode otherwise supplying said transformed address information segment to said address generator if said second system is operating in a Big Endian mode;

wherein said second bus address is generated by detecting which byte is a first enabled byte and how many consecutive bytes after said first enabled byte are also enabled.

13. Apparatus for interfacing a first 32-bit bus in a first system operating in a Little Endian mode and a second 64-bit bus in a second system operating in one of Little Endian mode and a Big Endian mode, comprising:

a circuit for combining a first address information segment F3 . . . F0 comprising byte enable signals with a second address information segment S3 . . . S0 comprising byte enable signals from said first bus to form a combined address information segment S3 . . . F0;

a circuit for reversing the order of said combined address information segment to form a transformed combined address information segment; and a circuit for supplying said combined address information segment to an address generator for said second system if said second system is operating in a Little Endian mode otherwise supplying said transformed combined address information segment to said address generator if said second system is operating in a Big Endian mode;

wherein said second bus address is generated by detecting which byte is a first enabled byte and how many consecutive bytes after said first enabled byte are also enabled.

* * * * *